United States Patent
Bertram et al.

[11] Patent Number: 6,115,404
[45] Date of Patent: Sep. 5, 2000

[54] DYNAMIC CONTROL OF REMELTING PROCESSES

[75] Inventors: Lee A. Bertram, Dublin, Calif.; Rodney L. Williamson; David K. Melgaard, both of Albuquerque, N. Mex.; Joseph J. Beaman, Austin, Tex.; David G. Evans, Clinton, N.Y.

[73] Assignee: Sandia Corporation, Albuquerque, N. Mex.

[21] Appl. No.: 09/244,372

[22] Filed: Feb. 3, 1999

[51] Int. Cl.[7] .......................... H05B 7/144; H05B 7/148
[52] U.S. Cl. ...................... 373/70; 373/50; 373/102; 373/105
[58] Field of Search ...................... 373/42, 47, 49, 373/67, 70, 102, 104, 105, 50

[56] References Cited

U.S. PATENT DOCUMENTS

| | | |
|---|---|---|
| 2,904,718 | 9/1959 | Cooper et al. . |
| 2,915,572 | 12/1959 | Buehl . |
| 2,942,045 | 6/1960 | Johnson . |
| 3,143,587 | 8/1964 | Buehl . |
| 3,186,043 | 6/1965 | Murtland, Jr. et al. . |
| 3,187,078 | 6/1965 | Murtland, Jr. et al. . |
| 3,364,295 | 1/1968 | Roberts . |
| 3,381,079 | 4/1968 | Murtland, Jr. et al. . |
| 3,385,920 | 5/1968 | Harbaugh et al. . |
| 4,096,344 | 6/1978 | Munson ................................ 373/70 |
| 4,131,754 | 12/1978 | Roberts . |
| 4,303,797 | 12/1981 | Roberts . |
| 4,578,795 | 3/1986 | Fisher et al. . |
| 4,663,764 | 5/1987 | Bretthauer et al. ..................... 373/104 |
| 4,742,528 | 5/1988 | Stenzel ..................... 373/70 |
| 4,775,981 | 10/1988 | Kohnert et al. . |
| 4,797,897 | 1/1989 | Stenzel et al. . |
| 4,881,239 | 11/1989 | Stenzel et al. . |
| 5,099,438 | 3/1992 | Gulden, Jr. et al. ..................... 364/550 |
| 5,708,677 | 1/1998 | Williamson et al. . |
| 5,930,284 | 7/1999 | Hysinger et al. .......................... 373/50 |

OTHER PUBLICATIONS

Mitchell, A., Textbook: *Electric Furnace Steelmaking*, Chapter 17 pp 191–236 AIME (1985).

Williamson, Rodney L., et al., Árc Voltage Distribution Properties as a function of Melting current, Electrode Gap, and CO Pressure during Vacuum Arc Remelting, *Metallurgical and Materials Transactions B*, vol. 28B, pp 841–853 (1977).

Melgaard, D.K., et al., "Controlling Remelting Process for Superalloys and Aerospace Ti Alloys," *Melting Technologies Overview*, JOM, pp 13–17 (Mar. 1998).

Zanner, F.J., "Metal Transfer During Vacuum Consumable arc Remelting," *Metallurgical Transactions B*, vol. 10B, pp 133–142 (Jun. 1979).

*Primary Examiner*—Tu Ba Hoang
*Attorney, Agent, or Firm*—George H. Libman

[57] ABSTRACT

An apparatus and method of controlling a remelting process by providing measured process variable values to a process controller; estimating process variable values using a process model of a remelting process; and outputting estimated process variable values from the process controller. Feedback and feedforward control devices receive the estimated process variable values and adjust inputs to the remelting process. Electrode weight, electrode mass, electrode gap, process current, process voltage, electrode position, electrode temperature, electrode thermal boundary layer thickness, electrode velocity, electrode acceleration, slag temperature, melting efficiency, cooling water temperature, cooling water flow rate, crucible temperature profile, slag skin temperature, and/or drip short events are employed, as are parameters representing physical constraints of electroslag remelting or vacuum arc remelting, as applicable.

10 Claims, 5 Drawing Sheets

DYNAMIC CONTROL OF REMELTING PROCESSES

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to control of remelting processes such as vacuum arc and electroslag remelting processes. More specifically, the present invention discloses a system for dynamic control of melt rate and electrode position during remelting processes.

2. Background Art

Electroslag remelting (ESR) and vacuum arc remelting (VAR) are consumable electrode melting processes used in the production of premium grade superalloys as well as for remelting of various grades of steel. VAR is also used to process zirconium and aerospace titanium alloys. Both processes rely on electrical current as an energy source for melting. Both processes also entail flow of electrical current through a consumable metal electrode. In VAR, an electrical arc is established at the electrode tip which heats the tip causing it to melt. During ESR, the electrical current flows out the electrode tip through a slag bath in which its tip is immersed. The bath is heated resistively by the current causing it to be molten. This molten slag bath melts the electrode tip as the electrode is fed into it. Ingots are grown in both processes as the electrodes are consumed. Both processes utilize a water-cooled copper crucible for this purpose. The ingots partially solidify in their water-cooled crucibles as the grow, the metal remaining molten near the top where the energy inputs are located. Overall, ESR and VAR help to produce fully dense, defect-free, homogenous ingots having the appropriate chemistry, physical size, and grain structure.

The rate at which the electrode is consumed, typically specified in terms of weight melted per unit of time, is an important process parameter. Control of the melt rate generally allows for the production of higher quality ingots. Sometimes melt rate is controlled in an open-loop fashion whereby melting occurs according to a preset current schedule. This type of control, although relatively simple to implement, does not respond well to process disturbances. Of particular concern are disturbances in the relationship between melt rate and melting current. Some researchers have tried to remedy such situations through use of active, closed-loop, melt rate control (U.S. Pat. No. 4,141,754, entitled "Automatic Melt Rate Control System For Consumable Electrode Remelting," to Roberts, issued Dec. 26, 1978). Such dosed-loop approaches typically use a load cell transducer to continuously monitor electrode weight. Electrode weight data provide a basis for estimating melt rate. Melt rate estimates feed back to the controller whereby the electrical current is varied by an amount proportional to the error between estimated and set-point melt rates. This type of melt rate control operates best under steady-state conditions that use a constant set point. In essence, simple closed-loop control is effective during steady-state melting or relatively slow transient melting only. Simple dosed-loop control is limited primarily because load cell data are very noisy and require averaging over many (typically twenty) minutes before a reasonably accurate melt rate can be estimated. In general, commercial melt rate controllers use simple closed-loop controllers that are inherently rather sluggish and not capable of implementing an aggressive melt rate schedule. Again, such controllers operate best under steady-state conditions where the intended or set point melt rate is constant. Prior-art melt rate control is purely responsive, based on past information, and simply state that over the last measurement period, the melt rate was too high or low, and order a decrease or increase of the current by some amount.

VAR and ESR are inherently dynamic processes. Though steady-state melting is usually desired in the middle portion of the remelting process, the beginning and ending regions are highly dynamic by nature. Optimization of these processes requires that intelligent melt rate schedules be implemented in these regions and this, in turn, requires dynamic melt rate control. For example, steep, precisely controlled melt rate ramps may be beneficial during startup. One may wish to drop the melt rate from its initially high value at startup to the nominal melt rate over a time period of a few minutes or even seconds. If reliable melt rate estimates are delayed by ten minutes, as is the case with the current generation of melt rate controllers, this is an impossible task because the ramp would be over long before the system ever registered a response. If one simply steps the current down to the nominal value associated with the desired melt rate, uncontrolled dynamics are introduced which cause the system to overshoot the target and then recover only very slowly (usually a few hours). This behavior results from the long times required for the heat stored in the electrode to reconfigure itself to accommodate the new melt rate. Similar problems are encountered when the melt rate is disturbed from its desired value. An example would be a melt rate deviation due to a cracked electrode. The current generation of melt rate controllers respond only very slowly and incorrectly, allowing sever, uncontrolled melt rate excursions to occur.

Electrode position is another suitable control parameter for remelting processes. In most VAR processes, the electrode is positioned to maintain the proper electrode gap, defined as the spacing between the electrode tip and the molten surface of the ingot. In most controllers, the gap is estimated by monitoring the voltage or by counting "drip shorts"—the momentary shorting of the voltage that occurs when a molten droplet forming on the electrode tip bridges the gap between the electrode and the molten pool below. However, during some transient periods, drip short measurements prove inadequate for indicating electrode position and gap. Similarly, for ESR, the electrode is positioned to maintain an appropriate immersion depth—the depth that the electrode tip is immersed in the molten slag bath. For ESR processes, the voltage "swing" or the variance of the voltage over a period of time, is used to estimate the depth. Sole use of such voltage values leads to unacceptably large variations in the immersion depth during transient periods and produces undesirable process instabilities.

For the foregoing reasons, ESR and VAR simple dosed-loop controllers prove inadequate for implementing practically anything other than a constant melt rate.

SUMMARY OF THE INVENTION
(DISCLOSURE OF THE INVENTION)

The present invention is of an apparatus and method of controlling a remelting process, comprising: providing measured process variable values to a process controller; estimating process state variables using a process model of the remelting process; and outputting the process state variable estimates. In the preferred embodiment, feedback and feedforward control devices receive the process state variable estimates and adjust inputs to the remelting process. The variables employed are one or more of the following: electrode weight, electrode mass, electrode gap, process current, process voltage, electrode position, electrode temperature, electrode thermal boundary layer thickness, electrode velocity, electrode acceleration, slag temperature, melting efficiency, cooling water temperature, cooling water flow rate, crucible temperature profile, slag skin temperature, and drip short events, and most preferably electrode thermal boundary layer thickness. Parameters representing physical constraints of electroslag remelting or vacuum arc remelting, as applicable, are employed in the model.

A primary object of the present invention is to provide effective control of remelting processes.

A primary advantage of the present invention is effective dynamic control of remelting, particularly when faults occur in the process, such as cracking of an electrode.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

The present invention relates to ESR and VAR, consumable electrode remelting processes typically used in production of premium grade superalloys as well as in remelting of various grades of steel. VAR is also used to process zirconium and aerospace titanium alloys. Enhanced dynamic control of these processes, which rely on electrical current as the source of energy for melting, can increase efficiency, product quality, and substantially reduce operating cost. The present invention enhances production of ingots having the appropriate chemistry, physical size, and grain structure.

The present invention comprises an apparatus and method for control based on a process model of the remelting process. Controlled variables are the rate at which the electrode is consumed, specified in terms of weight melted per unit of time, and the electrode gap (VAR), the mean distance between the electrode tip and the surface of the ingot, or the immersion depth (ESR), the depth to which the electrode tip is immersed in the molten slag. The active closed-loop controller of the present invention enhances system response to process disturbances that cause excursions in melt rate. The active controller relies on a process state estimator, the heart of which is the remelting process model, and real time process data to make real time estimates of the controlled variables. If a real time measure of electrode weight is available, for example from a load cell transducer, it is used to generate a correction to the model prediction of this variable. Melt rate is not derived from electrode weight data in this invention, but from the remelting model. Thus, this controller does not require electrode weight data to achieve control of melt rate, though electrode weight data improve the controller performance. In one embodiment of the present invention, the controller varies the electrical current and electrode feed rate by appropriate amounts so as to achieve constant process set points. In another embodiment, the set point may be ramped up or down in either a linear or non-linear fashion to achieve dynamic control of the process. Thus, the present invention is effective for melt rate control during steady-state melting, relatively slow transient melting, and highly dynamic melting processes.

The present invention overcomes limitations imposed by noisy load cell data—which typically require averaging over many (typically twenty) minutes before rendering reasonably accurate melt rate estimates. This is because the present invention does not use electrode weight data to estimate melt rate, only to correct it. Therefore, the present invention is capable of implementing very aggressive melt rate schedules, and even melt rate steps. Furthermore, the use of a process model in conjunction with historical melt rate data allows for more accurate melt rate estimates under dynamic conditions. This is because the model provides reliable estimates of, for example, current electrode weight or mass.

The present invention effectively controls melt rate dynamics when a very steep melt rate ramp is introduced into the process, or even a melt rate step, from a lower melt rate to a higher (or higher to lower). The present invention implements such aggressive transients without significant deviation from the target set point or dynamic target profile. This is because the model accounts for the finite thermal conductivity of the electrode tip. In ESR, the model also accounts for the thermal inertia of molten slag to overcome problems associated with process sluggishness. Through use of a process model, the present invention accounts for the time required for the thermal distribution in the electrode tip to adjust to new or changing process conditions. This allows the present invention to adequately handle sudden changes in melting current such as those required to produce a step in melt rate. The present invention readily achieves steady-state melting at the new commanded melt rate even when thermal diffusion time in the electrode tip is of-the-order of hundreds of minutes. Overall, the present invention allows for aggressive, dynamic melt rate control because the model anticipates and adjusts for the melting dynamics of the electrode. For example, the controller of the present invention has the ability to implement an initial command step increase in current that is significantly less than that required for steady-state melting at a higher melt rate set point. Under such circumstances, the system of the present invention then ramps the current up nonlinearly in just the right way so as to achieve the step (or steep ramp) without significant overshoot of the target melt rate.

The present invention also has the ability to use other or more than one process control parameter. For instance, the system accommodates the use of electrode position as a sole or an additional control parameter. In VAR, the electrode is positioned to maintain the proper electrode gap defined as the spacing between the electrode tip and the molten surface of the ingot. For control purposes, the gap is estimated by monitoring the process voltage or by counting drip shorts, the momentary shorting of the voltage that occurs when a molten droplet forming on the electrode tip bridges the gap between the electrode and the molten pool below. The present invention increases the accuracy of gap estimates during process transients by using electrode position as well as drip-shorts. Similarly, for ESR, the electrode is positioned so as to maintain an appropriate immersion depth, the depth that the electrode tip is immersed in the molten slag bath. For this process, the voltage "swing" or the variance of the voltage over a period of time, is used to estimate the depth. Here again, the present invention allows for adequate control in instances where transients previously led to unacceptably large variations in the immersion depth and process instability by using other measured values. The present invention also satisfies the need for control of the electrode drive speed, ie., the rate at which the electrode position must be changed to compensate for melting, which is also coupled to melt rate. The controller of the present invention is designed to handle the introduction of aggressive melt rate transients and unexpected process disturbances by, for example, adjusting the electrode position in an appropriate fashion.

The present invention comprises a highly dynamic apparatus and method of melt rate and electrode position control for the VAR and ESR processes. The present invention enables implementation of large and virtually instantaneous changes in melt rate (and electrode gap), as well as complex melt rate ramps while maintaining control of electrode position. Furthermore, the present invention is capable of responding accurately to process disturbances on a time scale of a few seconds rather than tens of minutes. Though desirable for purposes of correcting the model prediction, a means of measuring electrode weight is not absolutely necessary for use of the present invention. Such flexibility enables dynamic melt rate control without the additional cost of having to purchase, or retrofit, a furnace with a load cell. Where load cell measurements are used, the present invention minimizes disturbances due to noise and allows for more effective melt rate control.

Figure 1:
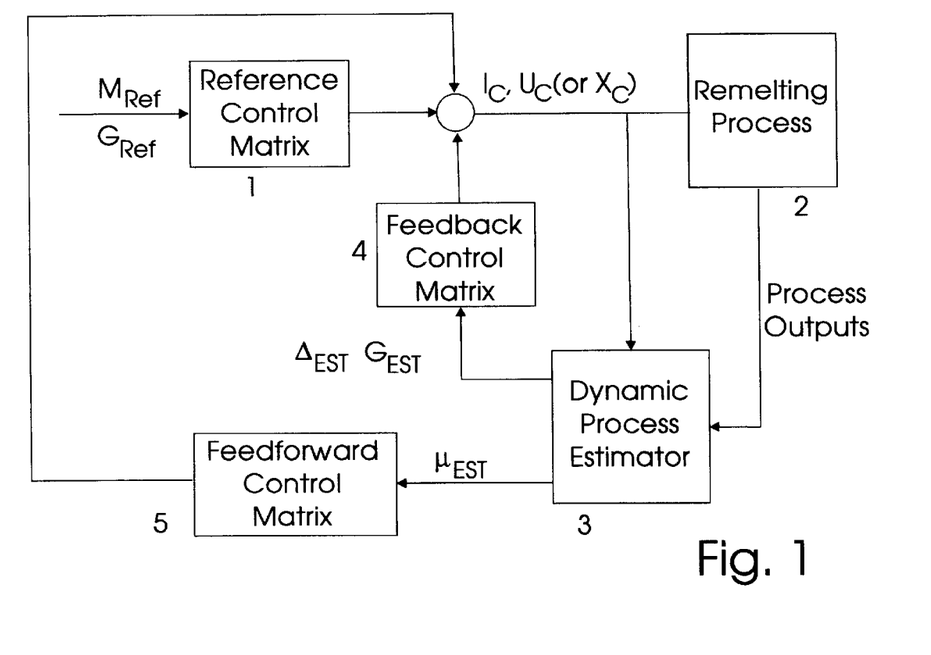
FIG. 1 is a schematic diagram of a feedback and feedforward control system.

A schematic diagram describing the invention is shown in FIG. 1. FIG. 1 shows the overall architecture of the remelting process control system. Inputs to the controller include reference values of the melt rate ($M_{REF}$) and either electrode gap or immersion depth (both denoted by $G_{REF}$) depending on whether the specific process is VAR or ESR. The inputs are fed to a Reference Control Matrix 1, which uses the information to output a commanded current ($I_C$) and an electrode velocity ($U_C$) (or for some applications, electrode position, $X_C$) for input to the Remelting Process 2. A juncture connecting outputs from the Reference Control Matrix 1, a Feedback Control Matrix 4, and a Feedforward Control Matrix 5, allows for adjustment of $I_C$, $U_C$ and $X_C$.

The feedback control is derived from operation of the Feedback Control Matrix 4 on the process response estimates provided by a Dynamic Process Estimator 3. Shown as response estimates in FIG. 1, are the estimated thermal boundary layer thickness in the electrode ($\Delta_{EST}$) and the estimated value of the electrode gap or immersion depth ($G_{EST}$). The present invention's use of thermal boundary layer information, for example, $\Delta_{EST}$, as a process feedback allows for dynamic melt rate control.

The present invention also has the ability to incorporate other process responses for feedback; however, thermal boundary layer thickness and electrode gap or immersion depth are preferred. The Dynamic Process Estimator 3 uses at least one of the commanded control inputs, $I_C$, $U_C$ and $X_C$, and the process outputs from the Remelting Process 2 to estimate the process state and disturbances using a model of the process. The model embodies relationships predictive of relevant dynamics of a remelting process. The Dynamic Process Estimator 3 also has the ability to estimate process variables that may be used as indicators of process disturbances. Such a variable is the process efficiency ($\mu_{EST}$), shown in FIG. 1. Process efficiency ($\mu$) may be defined as the ratio of the weight of material melted at a given power to the weight expected to melt from thermodynamic calculation. The present invention, however, is not limited to this particular definition because other measures exist that are suitable for achieving the same or similar results. Disturbance variables, e.g., $\mu_{EST}$, are input to the Feedforward Control Matrix 5 and converted to control output corrections.

The present invention comprises an apparatus and a method of consumable electrode melt rate control based on estimates of the thermal boundary layer in the electrode (or any other related quantity) as a process response suitable for feedback. It also comprises an apparatus and a method of electrode position control for remelting processes based on physical filtering. In a preferred embodiment of the present invention, an apparatus and method of dynamic melt rate control for remelting processes based on estimates of a thermal boundary layer in an electrode (or any other related quantity) as a process response suitable for feedback is provided. In another preferred embodiment of the present invention, an apparatus and method of electrode gap control for remelting processes based on an optimal estimate supplied by a physical filter employing estimates based on measurements (for example, drip-short data and voltage data) and a process model is provided. Further, the present invention provides an apparatus and method of dynamic melt rate control for remelting processes wherein the measured electrode weight data are omitted and, thus, melt rate control is achieved through estimating the thermal boundary layer in the electrode without the electrode weight data. The present invention also comprises an apparatus and a method of using melting efficiency as a measure of process disturbances during remelting so as to enable feedforward control to offset the effects of disturbances before they propagate through the process. An apparatus and method of using melting efficiency as a measure of when the melt zone is approaching the end of the consumable electrode during a remelting process and using this information to offset the end effect and maintain the melt rate set-point are also encompassed by preferred embodiments of the present invention.

INDUSTRIAL APPLICABILITY

The invention is further illustrated by the following non-limiting examples.

EXAMPLE 1

A preferred embodiment of the present invention was developed and tested for VAR. The essence of this embodiment applies to ESR processes and the art of consumable electrode remelting in general.

Figure 2:
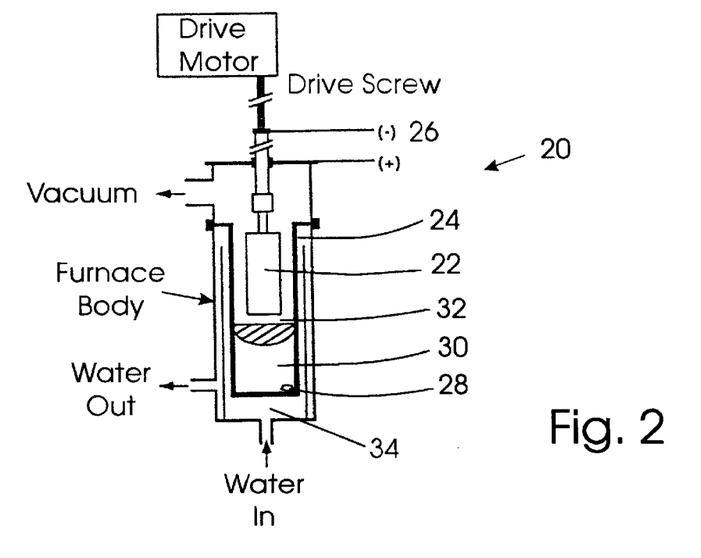
FIG. 2 is a diagram of a VAR remelter.

FIG. 2 illustrates a schematic diagram of a VAR furnace 20. A cylindrically shaped, alloy electrode 22 was loaded into the water-cooled copper crucible 24 of the VAR furnace 20, the furnace 20 was evacuated, and a DC electrical arc was struck between the electrode (cathode) 26 and some start material (serving as an anode 28, e.g., metal chips) at the bottom of the crucible 24. The arc heated both the start material anode 28 and the electrode tip 26, eventually melting both. As the electrode tip was melted away, molten metal dripped off and began forming an ingot 30 in the bottom of the crucible 24 while the electrode 26 was consumed. Because the crucible diameter was 75 mm larger than the electrode diameter, the electrode was translated downward toward the anode pool to keep the mean distance between the electrode tip and pool surface constant. This mean distance is called the electrode gap (G) 32. As the cooling water 34 extracted heat from the crucible wall, the molten metal next to the wall solidified. At some distance below the molten pool surface, the alloy became completely solidified yielding a fully dense ingot. After a sufficient period of time had elapsed, a steady-state situation evolved whereby a "bowl" of molten material formed on top of a fully solidified ingot base. As more material solidified, the ingot 30 grew.

Figure 3:
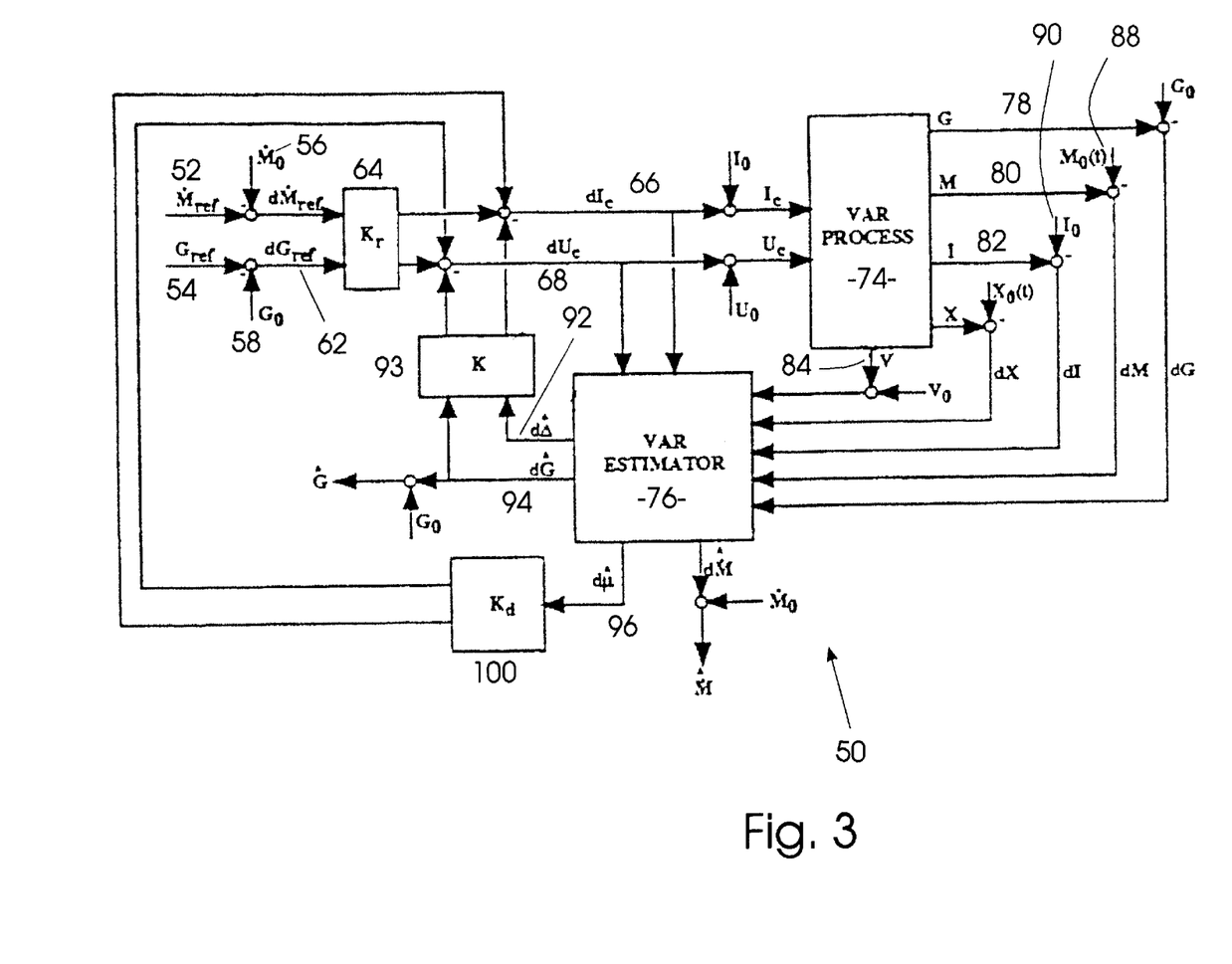
FIG. 3 is a schematic diagram of a feedback and feedforward control system.

Dynamic process control was implemented on the VAR furnace 20 as equipped with an electrode weight measurement transducer 50 as depicted in FIG. 3. Although not essential for operation, this particular embodiment of the invention comprises a linear controller designed around nominal values. Adaptation of the present invention's controller is possible to create a nonlinear controller to accommodate very large excursions from the nominal steady-state set points as required. However, in this linear controller embodiment, two inputs and two outputs were used which classifies the controller as a multiple input, multiple output (MIMO) type. The linear controller's two inputs were $M_{ref}$ 52 and $G_{ref}$ 54. The nominal values of the melt rate $M_O$ 56 and gap $G_O$ 58 were subtracted from the reference values to yield the difference values, $dM_{ref}$ 60 and $dG_{ref}$ 62. These reference values were input to and operated on by the $K_r$ Matrix 64 which converted any change from the nominal values into two controller outputs, a commanded difference current ($dI_c$) 66 and difference electrode velocity ($dU_c$) 68. These outputs were added to the nominal current ($I_O$) 70 and velocity ($U_O$) 72, respectively, and sent to the VAR Process 74. Though there was a good deal of VAR process knowledge programmed into $K_r$ 64, the commanded outputs needed "correction" due to process disturbances and transients as well as errors in the measured data and models. Correction was accomplished using outputs from the VAR estimator 76 as feedback. Electrode gap (G) 78, electrode weight (M) 80, melting current (I) 82, arc voltage (V) 84 and electrode position (X) 86 data were output from the VAR process and used as inputs into the estimator 76. In this example, all of these quantities were measured directly except for G 78, which was derived from drip-short data. These measurement means are well known to those practiced in the art. Nominal values for these outputs were subtracted before input to the estimator 76. Note that the nominal values $M_O$ 88 and $X_O$ 90 change with time as the melt progresses. The other two inputs required by the estimator were $dI_c$ 66 and $dU_c$ 68. Given the seven inputs shown, the estimator calculated estimated changes in the thermal boundary layer of the electrode ($d\hat{\Delta}$) 92, the electrode gap ($d\hat{G}$) 94, and the melting efficiency ($d\hat{\mu}$) 96. A thermodynamic process model was used to obtain estimates of the thermal boundary layer, $\Delta$. The thermal boundary layer, $\Delta$, represents the distance from the electrode tip to a point within the electrode where the internal temperature reaches ambient. In other words, the thermal boundary layer value serves as a measure of how heat is distributed in the electrode tip. Under ideal (ie., noise free, disturbance free, perfect model, nominal conditions, all of the estimated difference values would be zero and the estimated gap would equal the nominal gap and the estimated thermal boundary layer would match that required to produce the nominal melt rate. However, the estimator outputs are non-zero in most instances because of disturbances, noise, and model imperfections. The feedback control matrix 98 operated on these difference values to correct $dI_c$ 66 and $dU_c$ 68. When a process disturbance occurred, signified by a change in process melting efficiency in this embodiment of the invention, $d\hat{\mu}$ 96 was non-zero. This generated an output from the disturbance feedforward control matrix, $K_d$ 100, which was used to further correct $dI_c$ 66 and $dU_c$ 68.

This embodiment achieved dynamic process control through use of a process model. For VAR, the model was used to estimate the thermal distribution in the electrode (as characterized by $\Delta$) and the instantaneous rate at which material leaves the electrode through melting (instantaneous melt rate). For changes in $M_{ref}$ 52, a new $dI_c$ 66 was generated corresponding to what was required to produce the new steady-state melt rate. However, this value was corrected because of the time required for the thermal distribution in the electrode to reach steady-state. The knowledge of how $\Delta$ changes with time was contained in the process model and, therefore, the value of $d\hat{\Delta}$ 92 generated by the VAR Estimator 76 reflects these melting dynamics. For example, suppose one is melting at a steady-state and commands a sudden increase in melt rate by stepping $M_{ref}$ to a higher value. The present invention's model-based estimator initially outputs a value for $d\Delta_{EST}$ which reflects the old steady-state melt rate, which is larger than that required for the new, higher melt rate. This causes the commanded current to be less than what it would be without such a correction. As $\Delta$ shrinks at the new melt rate, this correction shrinks until, when $d\Delta_{EST}$ reaches the steady-state value of the new melt rate, the correction is zero. Thus, the commanded current is automatically changed in a non-linear fashion to produce the melt rate step. If this correction were not made and the dynamics of $\Delta$ not take into account, the initial current step would produce an overshoot in melt rate which would then relax to its steady-state value after a few hours. Obviously, this method applies equally well to a step down in melt rate. This technique allowed a new $M_{ref}$ to be achieved within the cycle time of the controller, in this case four seconds, without significant initial overshoot or undershoot. This preferred embodiment of the present invention also allowed for continuous, controlled, non-steady-state melting.

Figure 4:
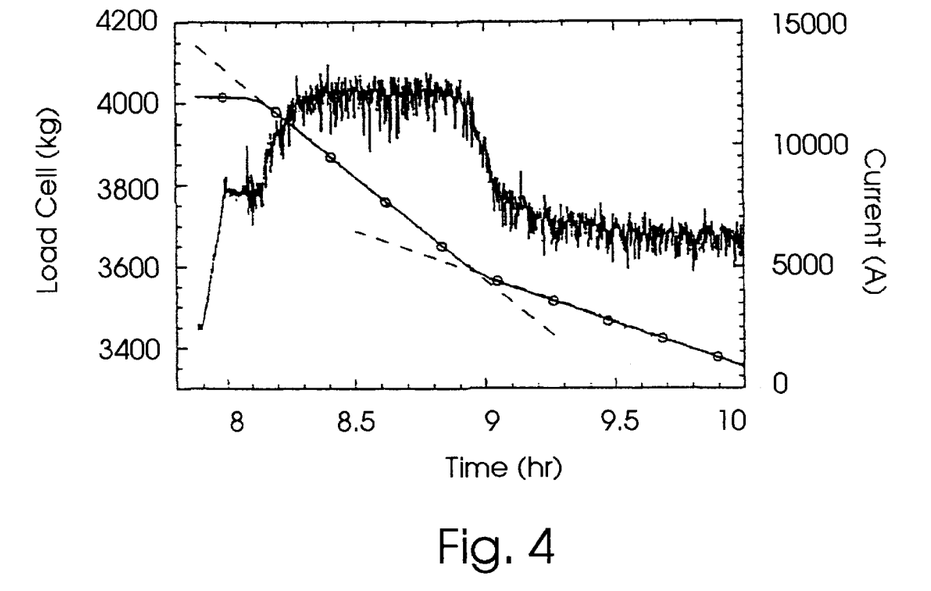
FIG. 4 is an illustration of transient load cell and melting current data from a remelting process.

FIG. 4 illustrates data that demonstrate the effectiveness of the present invention for controlling melt rate. The data in FIG. 4 show electrode weight (as measured by a load cell) and melting current as a function of time. The data were collected during the initial phase of VAR of a 0.43 m diameter nickel-base alloy electrode into 0.51 m diameter ingot. Each data point represents a four second average. Note that the electrode weight was initially constant indicating that melting had not started. The onset of melting is denoted by a sudden increase in the noise of the measured melting current. A few minutes after melting onset, a five minute melt rate ramp was initiated to increase the melt rate to 520 kg/hr and hold that rate for forty minutes. The measured melt rate during this period was 514 kg/hr. At the end of the forty minutes, a ten minute ramp down to 216 kg/hr was initiated. This melt rate was held throughout the steady-state portion of the melt. The measured melt rate during this time was 222 kg/hr. The dashed lines in the figure are lines fit to the load cell data. Within the constant melt rate regions described, the correlation constants for the fits are 0.99995 (at 514 kg/hr) and 0.99999 (at 222 kg/hr) demonstrating an extremely high degree of linearity. Note, however, the highly nonlinear nature of the current trace in the figure required to achieve the constant melt rates under these highly dynamic conditions. Because of the process model, there was sufficient intelligence built into the VAR Estimator to allow the controller to manipulate the current in this nonlinear fashion so that the melting process was dynamically controlled at all times to the specified melt rate set point.

Figure 5:
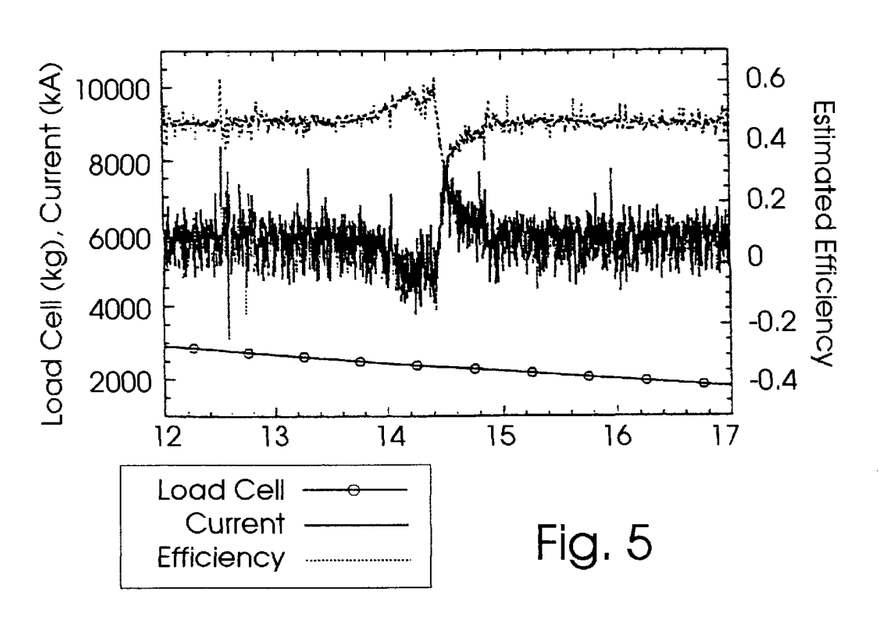
FIG. 5 is an illustration of transient load cell, melting current, and melting efficiency data from a remelting process.

FIG. 5 illustrates data that further demonstrate the utility of the present invention for an extremely dynamic VAR process disturbance. In this experiment, a saw cut was made in the same electrode used for the test from which the data shown in FIG. 4 were extracted. The cut was located approximately half way up the electrode by cutting in from one side to the electrode center. Thus, the electrode cross-sectional area was effectively cut in half at this point. Data collected during the controller response to the cut are illustrated in FIG. 5. About 45 minutes before the cut was melted through, the estimated melting efficiency (upper trace in the figure) began to climb from its nominal value of 0.46 due to a decrease in heat conduction through the cut region. The controller compensated for this dynamic change by dropping the current (middle trace) and, thereby, maintaining the melt rate (slope of the bottom trace) at its set-point value. After the cut was melted through, the efficiency suddenly dropped when the arc encountered cold electrode material above the cut. Again, the controller compensated by adjusting the current. Without this type of dynamic process control, maintenance of a set melt rate through such severe disturbances is impossible. Note that a similar process disturbance occurred when the electrode was near complete consumption. The thermal boundary layer reached the end of the electrode at this point and caused p to increase. If constant current were maintained in this region, melt rate would steadily rise. The present invention automatically compensated for this end effect by dropping the current to maintain the required melt rate set point.

Figure 6:
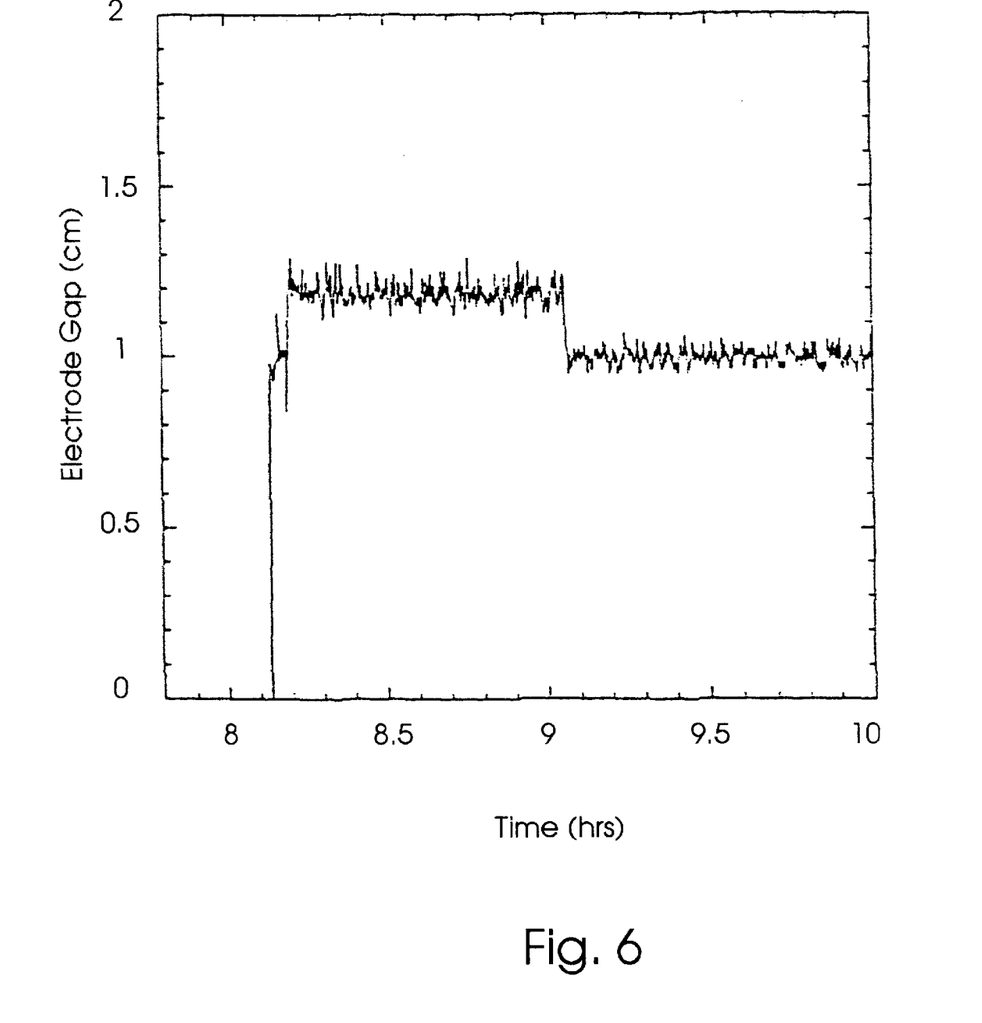
FIG. 6 is an illustration of transient electrode gap data from a remelting process.
Figure 7:
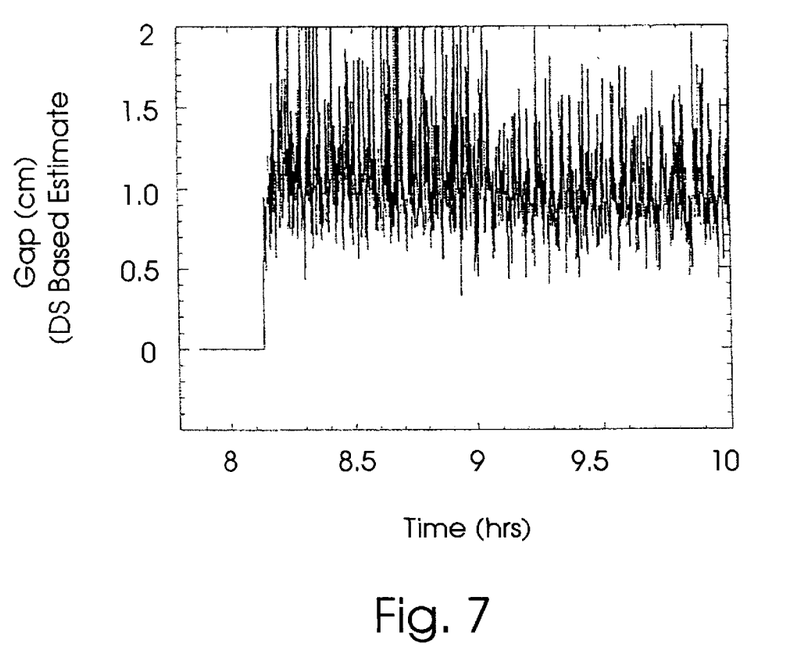
FIG. 7 is an illustration of transient electrode gap data from a remelting process.

Besides melt rate control, this embodiment of the present invention also demonstrated effective control of electrode gap. FIG. 6 shows $G_{EST}$ for the same test and the same time period as the data plotted in FIG. 4. Initially, $G_{ref}$ was set to 1.0 cm, but changed after a few minutes to 1.2 cm. Later $G_{ref}$ was again set to 1.0 cm as is evident in FIG. 6. The controller holds the electrode gap within a window about 0.1 cm wide during this dynamic melting situation. Electrode gap control was accomplished in this embodiment of the present invention in a novel and effective fashion. Electrode gap estimates were based on estimates derived from drip-short data and a process model of the melting process. Estimates based on drip-short data alone are rather noisy and require considerable averaging in traditional controllers. Inclusion of process model-based estimates provides for "physical filtering" of the drip-short estimate. For example, consider a drip-short estimate of a 0.5 cm change in electrode gap during a four second controller cycle. Through use of a process model, the controller accounts for the fact that neither the electrode position nor the electrode mass could have changed enough during this time period to produce such a large change in gap. Hence, the controller automatically filters erroneous gap excursions from drip-short data. The improvement in noise reduction realized by this technique is illustrated in FIG. 7. FIG. 7 shows a plot of electrode gap estimated solely from drip-short data. Use of such data for control purposes requires significant averaging which, in turn, slows the response of the controller to commanded changes and possibly masks gap disturbances.

This preferred embodiment of the present invention, as applied to gap control, uses estimates from a process model as an internal check. The internal check ensures that an estimated response parameter never exceeds physical possibilities and that such estimates always meet internal consistency criteria. The present invention defines this particular aspect of the process as "physical filtering." Physical filtering, as used herein, relies on a process model embodying physically representative data of the process and incorporation of the model into the controller. Typically for each given estimate, the controller combines a model estimate with a measurement-derived estimate of the response, applies an appropriate weight to each contribution, and produces an optimal estimate. In this preferred embodiment of the present invention, a Kalman filtering technique was used. However, the present invention is not limited to Kalman filtering because other means for physical filtering are also available.

The specific method of dynamic VAR process control shown in FIG. 3 may be easily modified so as to work on a furnace without a means of measuring electrode weight. In the embodiment shown in FIG. 3, melt rate was estimated from data derived from the process model of the melting process. If the load cell data were absent, the controller would rely solely on the correction derived from the other measured process variables, for example, electrode gap and electrode position. In general, estimates improve when additional process parameters are used, e.g., weight data. Use of additional parameters, although encompassed by the present invention, is not strictly required for implementation of effective control.

EXAMPLE 2

Figure 8:
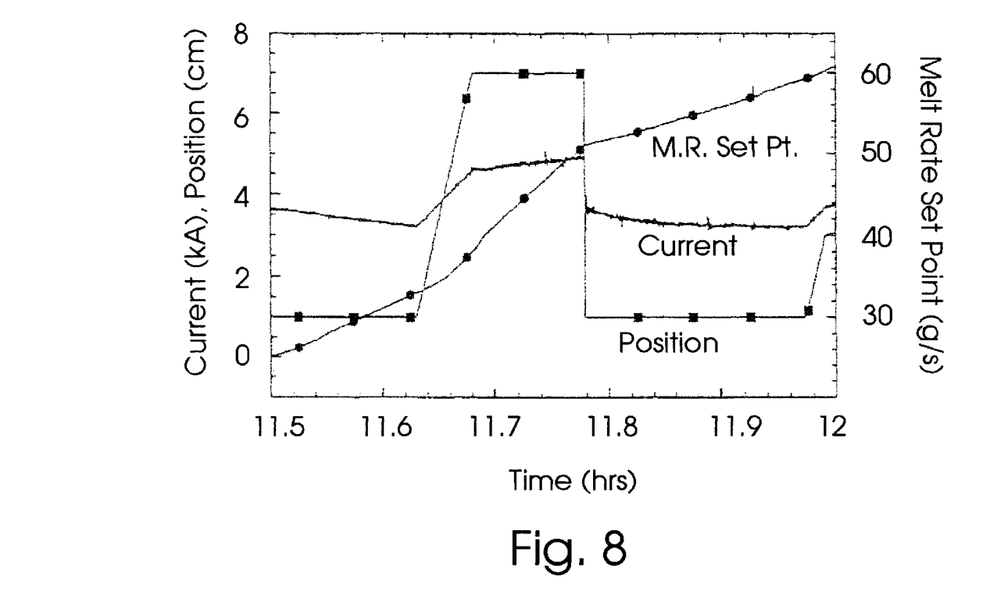
FIG. 8 is an illustration of transient electrode current, position, and melt rate set-point data from a remelting process.

FIG. 8 illustrates a plot of data acquired during VAR of a 0.20 m diameter nickel-base alloy electrode into 0.25 m diameter ingot on a furnace with no electrode weight measurement transducer. In general, direct measure of melt rate is not available in the absence of a weight measurement device. However, the data in FIG. 8 shows a plot of electrode position (solid circles) the slope of which is directly related to melt rate, assuming a constant electrode gap and electrode density. The data plotted in FIG. 8 demonstrate that as the melt rate set point (solid squares) changed, the current responded appropriately, as indicated by the slope of the position trace.

EXAMPLE 3

An important procedure that requires dynamic process control for both the VAR and ESR processes is the hot-top or cut-back procedure. This occurs near the end of melting and involves cutting back the melt rate from its steady-state value to zero. Cutting back of the melt rate is rather difficult to accomplish while maintaining melt-to-melt consistency when using traditional methods of melt rate control. Generally, cut back is accomplished by a rather slow, linear current ramp. The ramp down must be slow so that melt rate can keep pace with the current. A current ramp that is too steep causes the melt rate to undershoot the target as discussed above. The present invention allows for very consistent cut-backs.

Furthermore, the present invention allows for fast, non-linear controlled cut-backs that give melting engineers the freedom to design cut-back procedures to accommodate the solidification dynamics of the alloy Involved.

The data presented show the utility of the present invention in achieving dynamic control of VAR processes. Such dynamic control is beyond the reach of currently available remelting process controllers.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A controller in a remelting process wherein the position and melting rate of an electrode are controlled by adjusting electrode current and feed velocity; comprising:

control means for adjust electrode feed velocity and current;

means for providing commanded process inputs to said control means;

means for providing measured process variable values;

process estimator means employing said measured process variable values, said commanded process inputs, and a model of said remelting process to estimate real time process variable values;

said control means using estimated real time process variable values to adjust the electrode feed velocity and current.

2. The controller of claim 1 wherein said process estimator means comprises means for employing electrode thermal boundary layer thickness.

3. The controller of claim 1 wherein said remelting process is selected from the group consisting of electroslag remelting and vacuum arc remelting.

4. The controller of claim 1 wherein said real time process variable values include an estimate of the melting efficiency, defined as the ratio of the energy theoretically required to melt a given mass of material to the amount of energy actually required.

5. The controller of claim 4 wherein said real-time process variable values further include electrode thermal boundary layer thickness.

6. A method of controlling a remelting process wherein the position and melting rate of an electrode is a function of feed velocity and electrode current, the method comprising the steps of:

a) applying measured process variable values and commanded process inputs to a process estimator having a model of the remelting process;

b) estimating with the estimator real time process variable values; and c) using the estimated real time process variable values to adjust the electrode feed velocity and current.

7. The method of claim 6 wherein the estimating step comprises employing parameters representing physical constraints of a remelting process.

8. The method of claim 6 wherein the estimating step comprises estimating process variable values of at least one process selected from the group consisting of electroslag remelting and vacuum arc remelting.

9. The method of claim 6 wherein said real time process variable values include an estimate of the melting efficiency, defined as the ratio of the energy theoretically required to melt a given mass of material to the amount of energy actually required.

10. The method of claim 9 wherein said real-time process variable values further include electrode thermal boundary layer thickness.

* * * * *